United States Patent [19]

Okamoto

[11] Patent Number: 5,260,789

[45] Date of Patent: Nov. 9, 1993

[54] IMAGE MEMORY DEVICE

[75] Inventor: Ichiro Okamoto, Yokohama, Japan

[73] Assignee: Matsushita Electric Industrial Co., Ltd., Osaka, Japan

[21] Appl. No.: 705,789

[22] Filed: May 28, 1991

[30] Foreign Application Priority Data

Jun. 6, 1990 [JP] Japan .................. 2-147824

[51] Int. Cl.[5] ............................................ H04N 5/04
[52] U.S. Cl. ........................................ 358/149; 358/160
[58] Field of Search ................ 358/149, 148, 160; 365/189.04

[56] References Cited

U.S. PATENT DOCUMENTS

| 4,689,676 | 8/1987 | Nakajima et al. | 358/149 |
| 4,797,743 | 1/1989 | Miyazaki | 358/149 |
| 4,864,402 | 9/1989 | Ebihara et al. | 358/160 |
| 4,987,559 | 1/1991 | Miyauchi et al. | |

FOREIGN PATENT DOCUMENTS 0253074 1/1988 European Pat. Off. .

*Primary Examiner*—Victor R. Kostak
*Assistant Examiner*—David E. Harvey
*Attorney, Agent, or Firm*—Stevens, Davis, Miller & Mosher

[57] ABSTRACT

An image memory device uses two line memories in a memory array of a field memory in lieu of an externally mounted line memory. Further, an instruction of bi-directional transfer between a memory array and an output buffer memory is used. Thereby, a motion picture discontinuity phenomenon can be avoided even if a motion picture video signal is asynchronously input and output.

2 Claims, 4 Drawing Sheets

IMAGE MEMORY DEVICE

BACKGROUND OF THE INVENTION

1. Field of the Invention

The present invention relates to an image memory device for taking the synchronization of image signals with different timings which signals appear in, for example, a frame synchronizer, a vision mixer, a video switcher or the like.

2. Description of the Prior Art

Firstly, a motion picture discontinuity phenomenon which may occur in the case where a motion picture video signal is asynchronously input and output, will be explained by virtue of FIGS. 3 to 5. Generally, in the case where the read and write operations are asynchronously conducted, a frame passing phenomenon may take place, since there is almost no complete coincidence between the read and write frequencies. Now consider the case where the writing side will soon come up with the reading side taken as a reference. In this case, since the writing for a certain line in a memory is made after the reading of that line, as shown in FIG. 3, the reading on the reading side always precedes by one field as compared with the writing on the writing side. Next, consider the case where the writing side passed the reading side ahead, as shown in FIG. 4. In this case, since the reading is made immediately after the writing, the write operation and the read operation make access to the same field. Therefore, old data and new data co-exist in the output of a field in which the passing has occurred. Accordingly, in the case of a motion picture, there results in a discontinuous image. Especially, in the case of an output signal of a VTR, since it contains jitters, the passing continuously takes place, thereby resulting in a disturbed image.

In the conventional technique, a line memory 5.3 is provided separately from a field memory 5.2, as shown in FIG. 5, in order to avoid the above-mentioned discontinuity phenomenon. Namely, the phase of a vertical synchronizing signal on the input side and that of a vertical synchronizing signal on the output side are compared with each other at the beginning of each field. In the case where a difference between both the phases becomes smaller than 1H, a selector 5.4 is switched so that data of a line preceding a current line by 1H are read and delivered to a serial output memory, thereby avoiding the passing. Next, in order to take a time matching, a signal delayed by 1H is read from the line memory at a synchronized timing so that no discontinuity is produced.

In the conventional method, however, the line memory 5.3 is required in addition to the field memory 5.2. Therefore, this method is not satisfactory in the aspect of cost and space.

SUMMARY OF THE INVENTION

An object of the present invention is to avoid the discontinuity phenomenon without using such a line memory as mentioned above.

In the present invention, two free line memories in a memory array of a field memory are used in lieu of an externally mounted line memory and an instruction of bi-directional transfer between an memory array and an output buffer memory is used.

According to the present invention, a separate line memory is not required. Therefore, the number of parts required can be reduced while avoiding the discontinuity phenomenon.

DESCRIPTION OF THE PREFERRED EMBODIMENTS

Figure 1:
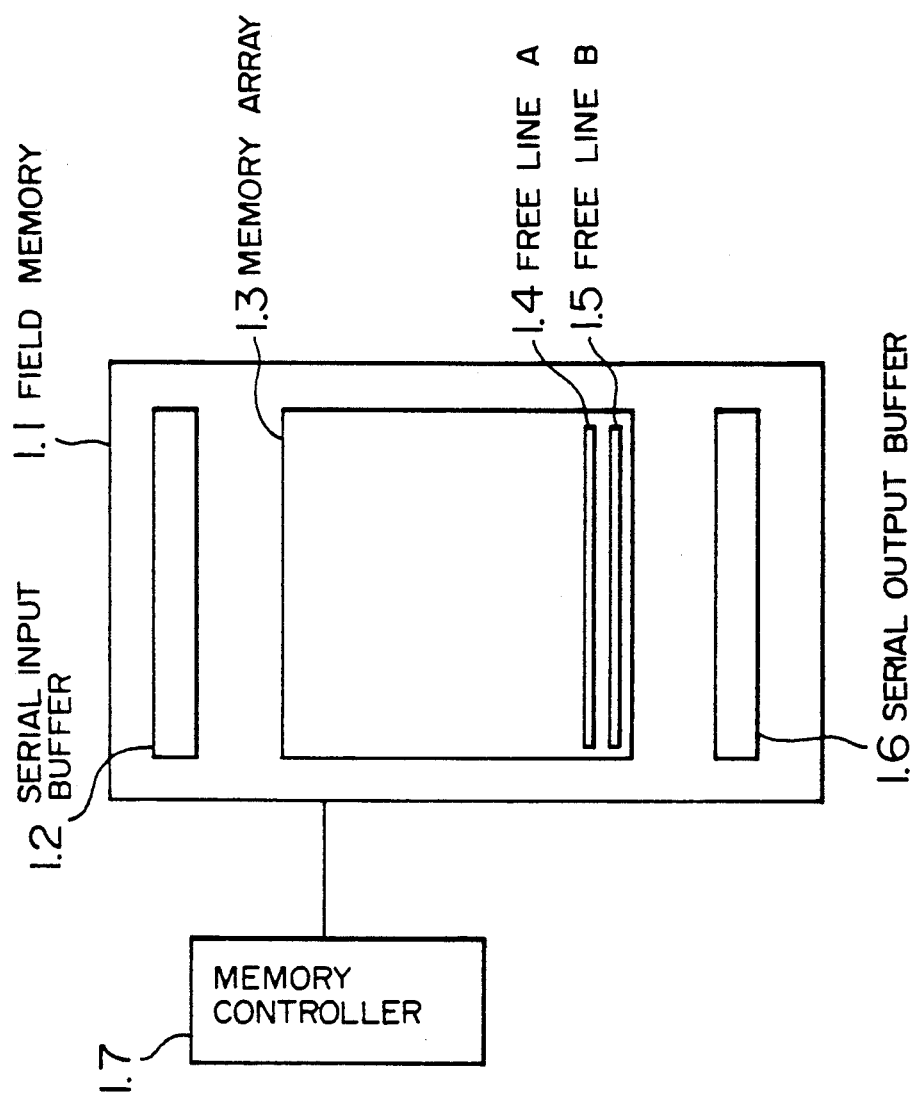
FIG. 1 is a block diagram showing the construction of an image memory device in an embodiment of the present invention.

FIG. 1 is a block diagram of an image memory device according to an embodiment of the present invention. In FIG. 1, reference numeral 1.1 denotes a field memory, numeral 1.2 a serial input buffer (memory portion) in the field memory 1.1, numeral 1.3 a memory array portion, numeral 1.4 an unused or free line A in the memory array, numeral 1.5 another unused or free line B in the memory array, numeral 1.6 a serial output buffer memory portion, and numeral 1.7 a memory controller composed of a logic circuit which controls the field memory 1.1. In this memory device, bi-directional transfer is possible between the output buffer 1.6 and the memory array 1.3.

Next, the operation of the image memory device having the above construction will be explained. First, the explanation will be made in conjunction with the case where a difference between the phase of a vertical synchronizing signal on the input side and that of output side compared at the beginning of each field is larger than 0.5 H (or a field passing phenomenon does not occur). A motion picture video signal is stored into the memory array 1.3 through the serial input buffer 1.2, is thereafter sequentially stored into a line memory of the serial output buffer 1.6 temporally, and is thereafter output from the serial output buffer 1.6 in synchronism with an output synchronizing pulse. There is now assumed the case where no field passing phenomenon occurs. In this case, when a signal of the m-th line in one field is stored into the serial input buffer 1.2, the m-th line data are written into the m-th line in the memory array 1.3 (from which the previous data have already been transferred) and data of the (m+1)th line in the memory array 1.3 is transferred to the serial output buffer 1.6. Before a signal of the next (m+1)th line is input into the serial input buffer 1.2, the (m+1)th line data in the serial output buffer 1.6 are output therefrom in synchronism with an output synchronizing signal. Accordingly, before data of a certain line are stored into the serial input buffer, data of a line in the memory array 1.3 corresponding to that line are transferred into the serial output buffer 1.6 and is output from the serial output buffer by an output synchronizing signal.

On the other hand, in case where a phase difference between an input and an output becomes very small, the above processing causes a motion picture discontinuity phenomenon owing to a field passing. Next, the explanation will be made of the case where a difference between the phase of a vertical synchronizing signal on the input side and that of a vertical synchronizing signal on the output side compared at the head of each field is smaller than 0.5 H (or a field passing phenomenon may occur).

Figure 2A:
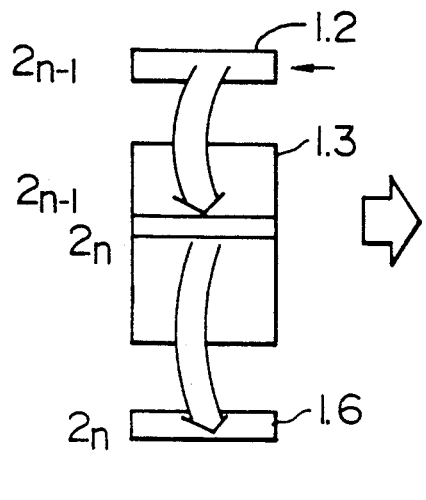
FIGS. 2A to 2F illustrate the operation of the image memory device shown in FIG. 1.
Figure 2B:
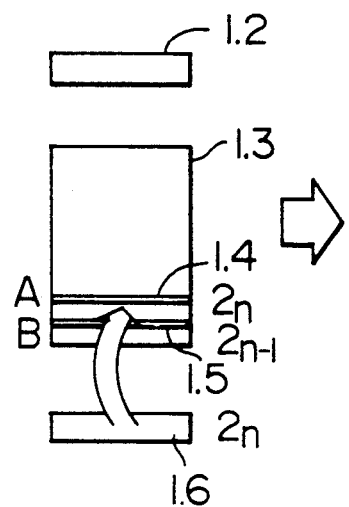
Figure 2C:
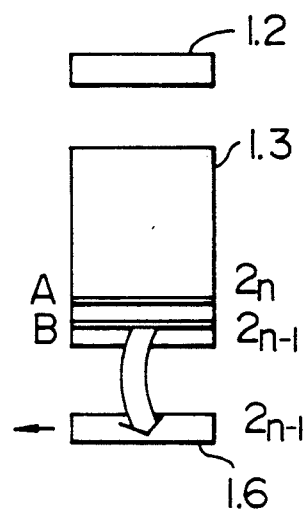

FIGS. 2A to 2F show the operation of the image memory device for avoiding a motion picture discontinuity phenomenon caused by the field passing phenomenon. FIGS. 2A, 2B and 2C illustrate the operation of an odd line in one field. Now consider the case where a difference in phase between a vertical synchronizing signal on the input side and a vertical synchronizing signal on the output side becomes smaller than 0.5 H and the (2n-1)th line is to be read/written. As shown in FIG. 2A at the point of time when the (2n-1)th line is written into the memory array 1.3 through the serial input buffer 1.2, the reading side transfers the 2n-th line of an even line from the memory array 1.3 to the serial output buffer 1.6. And, the 2n-th line data are further transferred to a free line of the memory array 1.3 (a free line A 1.4 in the shown case), as shown in FIG. 2B. Next, the (2n-1)th data are transferred to another free line (a free line B 1.5 in the shown case) through the above operation before 1H is transferred to the serial output buffer 1.6 as shown in FIG. 2C. Apparently, it may seen that the (2n-1)th data are simultaneously input and output. But, since the transfer of data from the memory array 1.3 to the output buffer 1.6 is made in a manner shifted by one line, a discontinuity phenomenon can be avoided even if a field passing phenomenon occurs.

Figure 2D:
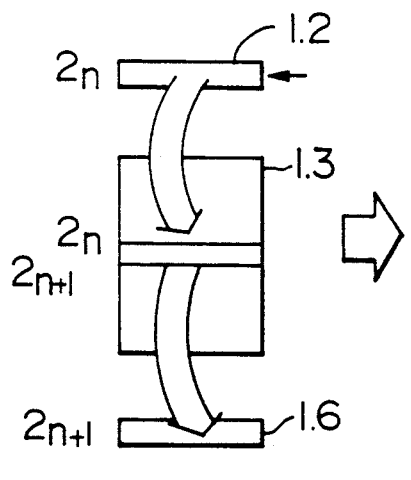
Figure 2E:
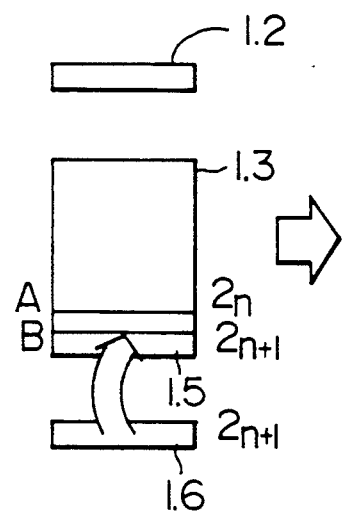
Figure 2F:
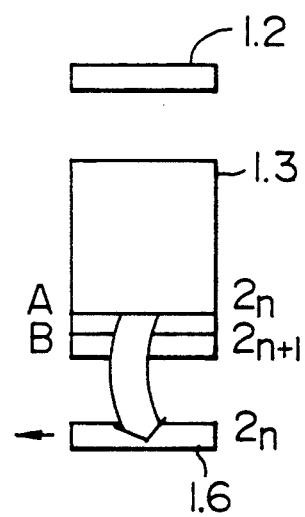
Figure 3:
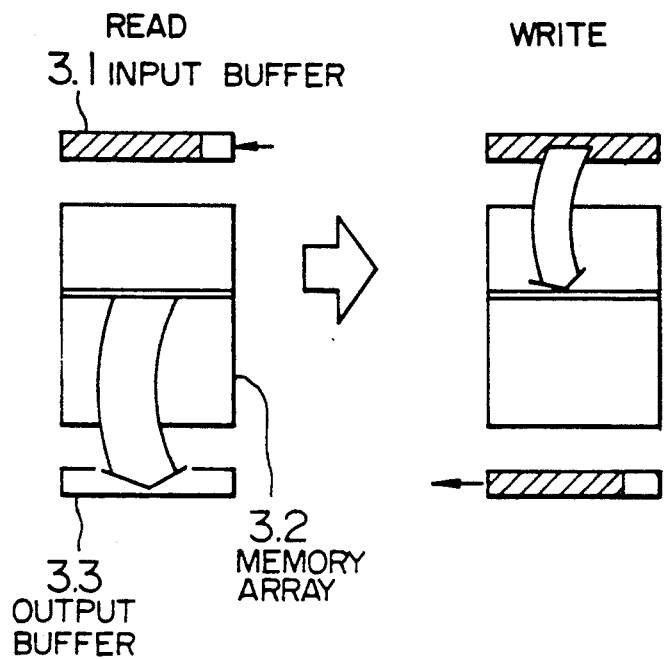
FIGS. 3 and 4 are views for explaining a discontinuity phenomenon upon operation of the conventional image memory device.
Figure 4:
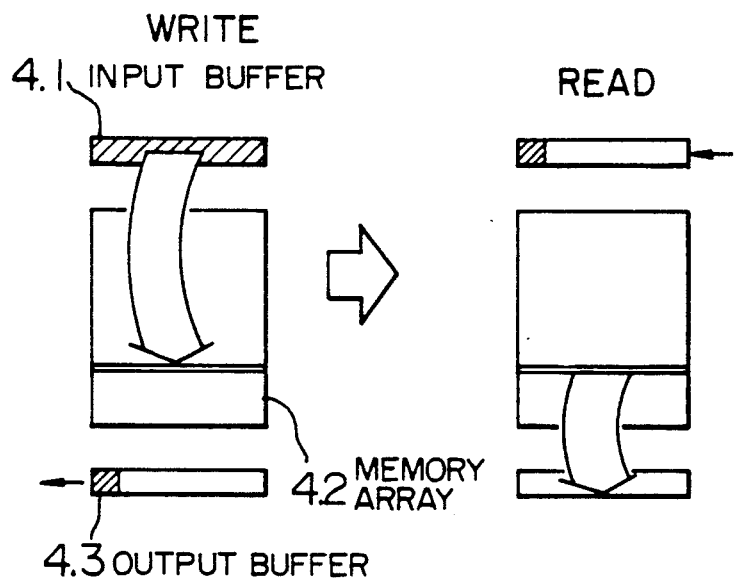
Figure 5:
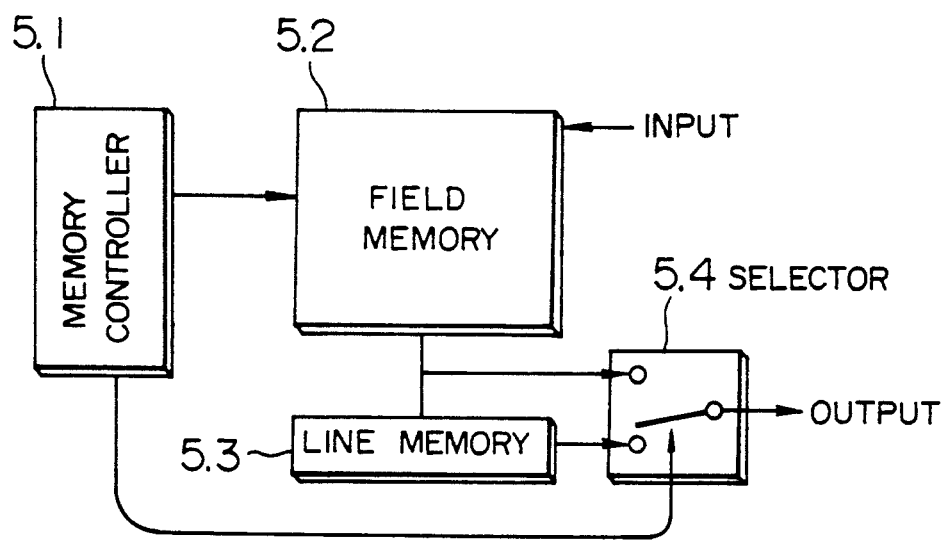
FIG. 5 is a block diagram of the conventional image memory device.

Similarly, the operation of the 2n-th line is shown in FIGS. 2D, 2E and 2F. Firstly, the (2n+1)th data are transferred to the serial output buffer 1.6, as shown in FIG. 2D, and are immediately transferred to the free line B 1.5 in the memory array 1.3, as shown in FIG. 2E. Thereafter, the 2n-th line data saved before 1H are transferred to the serial output buffer 1.6, as shown in FIG. 2F. The above operation is repeated during one field, thereby making it possible to avoid a discontinuity phenomenon.

In the above embodiment, an instruction of bi-directional transfer between the serial output buffer 1.6 and the memory array 1.3 is used. Alternatively, an instruction of bi-directional transfer between the serial input buffer 1.2 and the memory array 1.3 may be used. In this case, after data (2n+1) of the serial input buffer 1.2 have been transferred to the free line A (or B) and data (2n) of the other free line B (or A) have been transferred to the serial input buffer 1.2, the data (2n) are written into the memory array 1.3 and data (2n+1) of the memory array 1.3 are read and transferred to the serial output buffer 1.6.

In the foregoing, an image memory method of a motion picture video signal using free lines has been explained in conjunction with a difference in phase between a vertical synchronizing signal on the input side and a vertical synchronizing signal on the output side is smaller than 0.5 H. However, the value of a phase difference may be changed, as required.

As apparent from the embodiment mentioned above, if the present invention is applied, a motion picture discontinuity phenomenon can be avoided, a field synchronizer can be constructed at a low cost and with a small size, and the reliability can be improved by the reduction in number of parts. Further, a digital signal pattern on a printed board is reduced. This minimizes undesirable radiation advantageously.

I claim:

1. An image memory device comprising:

a memory array including a first memory area having a capacity sufficient for storing one field of data of an image and a second memory are which includes two sections, each of the two sections having a capacity sufficient for storing a part of the one field of data of the image, said part having a predetermined size;

a serial input buffer memory for serially receiving successive fields of data of the image and for temporarily storing parts of one field of data of the image one-by-one, each of said parts stored in the serial input buffer memory having said predetermined size;

a serial output buffer memory for temporarily storing parts of one field of data of the image one-by-one, each of said parts stored in the serial output buffer memory having said predetermined size, and for serially outputting said parts stored in the serial output buffer memory;

means for successively transferring said parts of said one field of data of the image stored in the serial input buffer memory to the first memory area so as to transfer the one field of data of the image into the first memory area;

means for transferring the one field of data stored in the first memory are in successive data parts, each of the successive data parts having said predetermined size, to the serial output buffer memory under a first condition where a timing of receiving the one field of data by said first memory area and a timing of outputting the one field of data from said first memory area have a predetermined relationship; and means for transferring the one field of data stored in the first memory area in successive data parts, each having said predetermined size, to the two sections of the second memory area in alternation and for transferring said data parts one-by-one from the two sections of the second memory area in alternation to the serial output buffer memory, instead of transferring the one field of data stored in the first memory area directly to the serial output buffer memory, under a second condition where a timing of receiving by said first memory area the one field of data and a timing of outputting the one field of data from said first memory area do not have said predetermined relationship.

2. An image memory device according to claim 1, wherein said capacity of said second memory area is sufficient for storing two lines of data of said image.

* * * * *